US012510364B2

(12) United States Patent
Mensch et al.

(10) Patent No.: US 12,510,364 B2
(45) Date of Patent: Dec. 30, 2025

(54) METHOD FOR PLANNING A TRAJECTORY IN PRESENCE OF WATER CURRENT

(71) Applicant: SERCEL, Carquefou (FR)

(72) Inventors: Thomas Mensch, Massy (FR); Timothée Moulinier, Massy (FR)

(73) Assignee: SERCEL, Carquefou (FR)

( * ) Notice: Subject to any disclaimer, the term of this patent is extended or adjusted under 35 U.S.C. 154(b) by 578 days.

(21) Appl. No.: 17/294,597

(22) PCT Filed: Nov. 19, 2019

(86) PCT No.: PCT/EP2019/081734
§ 371 (c)(1),
(2) Date: May 17, 2021

(87) PCT Pub. No.: WO2020/104418
PCT Pub. Date: May 28, 2020

(65) Prior Publication Data
US 2022/0011115 A1 Jan. 13, 2022

(30) Foreign Application Priority Data
Nov. 21, 2018 (EP) .................................... 18306537

(51) Int. Cl.
G01C 21/20 (2006.01)
B63B 79/15 (2020.01)
G01V 1/38 (2006.01)

(52) U.S. Cl.
CPC ............ G01C 21/203 (2013.01); B63B 79/15 (2020.01); G01V 1/3843 (2013.01)

(58) Field of Classification Search
None
See application file for complete search history.

(56) References Cited

U.S. PATENT DOCUMENTS 9,116,257 B2 * 8/2015 Pritchard ............. G01V 1/3808
9,494,429 B2 * 11/2016 Drange .................. G01C 13/00
(Continued)

FOREIGN PATENT DOCUMENTS

CN  104950882     9/2015
CN  104950882 A * 9/2015
(Continued)

OTHER PUBLICATIONS

Headifen (Maneuvering Under Power, 2008) (Year: 2008).*
International Search Report dated Dec. 2, 2019.
Australian Office Action dated Nov. 4, 2024.

Primary Examiner — Redhwan K Mawari
Assistant Examiner — Kai Nmn Wang
(74) Attorney, Agent, or Firm — IPSILON USA, LLP

(57) ABSTRACT

A method performed by a marine vessel plans a trajectory between a first point and a second point, the trajectory having a first path and a second path. The method includes a first step of computing a theoretical trajectory in a ground reference frame from the first point to the second point, assuming an absence of water current. The theoretical trajectory has a first theoretical path and a second theoretical path. A second step includes computing a second path in the ground reference frame, and a third step includes computing a corrected first path in a water reference. A fourth step includes computing the trajectory in the ground reference frame from the first point to the second point based on the corrected first path and the second path.

10 Claims, 4 Drawing Sheets

(56) References Cited

U.S. PATENT DOCUMENTS

| | | | |
|---|---|---|---|
| 9,529,108 B2 * | 12/2016 | Cambois | G01V 1/3835 |
| 9,933,536 B2 * | 4/2018 | Gagliardi | G01V 1/3808 |
| 2009/0097355 A1 | 4/2009 | Clement | |
| 2009/0141587 A1 | 6/2009 | Welker et al. | |
| 2012/0134235 A1 * | 5/2012 | Ilinsky | G01V 1/3808 |
| | | | 367/21 |
| 2013/0242694 A1 * | 9/2013 | Wu | B63B 21/66 |
| | | | 367/16 |
| 2014/0321238 A1 * | 10/2014 | Winfield | G01V 1/3817 |
| | | | 367/16 |
| 2015/0160360 A1 * | 6/2015 | Leveille | G01V 1/3808 |
| | | | 367/15 |
| 2016/0139284 A1 * | 5/2016 | Meech | G01V 1/3808 |
| | | | 367/14 |
| 2016/0238403 A1 * | 8/2016 | Brown | G01C 21/3632 |
| 2017/0205490 A1 * | 7/2017 | Mathew | H04W 16/18 |
| 2017/0228478 A1 * | 8/2017 | Alexander-Buckley | |
| | | | B63B 21/50 |
| 2017/0269248 A1 | 9/2017 | Moulinier et al. | |
| 2018/0074503 A1 * | 3/2018 | Meier | B63B 79/40 |

FOREIGN PATENT DOCUMENTS

| | | | |
|---|---|---|---|
| CN | 103576555 | | 5/2016 |
| CN | 103576555 B | * | 6/2016 |

\* cited by examiner (prio art)

METHOD FOR PLANNING A TRAJECTORY IN PRESENCE OF WATER CURRENT

RELATED APPLICATION

This application is a National Phase of PCT/EP2019/081734 filed on Nov. 19, 2019, which claims the benefit of priority from European Patent Application No. 18 306 537.4, filed on Nov. 11, 2018, the entirety of which are incorporated by reference.

FIELD OF THE INVENTION

Embodiments of the subject matter disclosed herein generally relate to a method for planning a trajectory to be performed by a marine vessel and a method for performing the trajectory as planned.

DESCRIPTION OF RELATED ART

Marine seismic data acquisition and processing techniques are used to generate a profile (image) of a geophysical structure (subsurface) under the seafloor. This profile does not necessarily provide an accurate location for oil, gas reservoirs and other natural resources, but it may suggest, to those trained in the field, the presence or absence of oil and/or gas reservoirs. In other words, such an image of the subsurface is a necessary tool today for those drilling exploration wells for minimizing the potential of finding a dry well. Thus, providing a better image of the subsurface is an ongoing process.

FIG. 1 illustrates a classical seismic survey system 100 used for seismic data acquisition. The system includes a survey vessel 102, which tows a source array 110 with source elements 112 that generate waves directed to the surveyed area and a streamer spread 103 comprising a plurality of streamers 104, each of the streamers having one or more receivers (not represented) for receiving reflections from the surveyed area.

The source array 110 is coupled to the survey vessel 102 by a plurality of source cables 114 and the streamers 104 are coupled to the survey vessel 102 by a plurality of lead-in cables 108. Spread ropes 106 laterally couple adjacent lead-in cables 108 to each other and are designed to prevent the distance between adjacent streamers from exceeding a desired distance. Wide-tow ropes 118 are connected to spurlines 119, the wide-tow ropes 118 being placed on each side of the streamer spread 103. Wings or deflectors 116 are connected to the spurlines 119 via a lever-arm (not illustrated) to achieve parallel trajectories for the streamers 104 in the towing direction and also to achieve a desired separation between the center-most lead-in cables 108.

The geometry of the spread, which corresponds to the position of the towed seismic elements (i.e. streamers 104, lead-in cables 108, source arrays 110, source cables 114, deflectors 116, wide-tow ropes 118, spurlines 119, and the like) relative to each other, is pre-determined depending on the surface to be survey.

During a marine seismic survey, the survey vessel 102 generally sails back and forth along parallel seismic acquisition sail lines 120 and 120'. At the end of a seismic acquisition sail line 120, i.e. at point A, the vessel 102 performs a 180 degree turn (or 180° turn) manoeuver in order to start, at point B, a next seismic acquisition sail line 120' with the towed seismic elements of the seismic survey system 100, in particular the streamers 104, aligned.

During the turn manoeuver, the trajectory to be followed by the survey vessel 102 may be described as a sequence of straight portion(s) and curved portion(s), the curved portions being for example a series of arc of circle(s). The curved portions are usually characterized by a turning radius. Generally, this turning radius is chosen large enough to preserve the integrity of the towed seismic elements, mainly the streamer spread 103, during the turn manoeuver and to accommodate various ocean current conditions. In particular, the turning radius is chosen in order to be able to keep control of the geometry of the spread, mainly the streamers, and to stay within the technical specifications of both the seismic elements and the rigging of the marine vessel. The turning radius mainly depends on the features and size of the towed seismic elements, in particular mechanical and hydrodynamic properties thereof, and also depends on the length of the streamers 104 and on the width of the streamer spread 103 (i.e. the crossline distance between the two outer-most streamers 104). Another important feature of the turn manoeuver is the run-in portion which is defined as a straight portion between the end of the curved portion (point C) and the start (point B) of the next seismic acquisition line 120'. The run-in portion corresponds to the distance required for the streamers to be steadied and aligned before starting the next seismic acquisition line. The length of the run-in portion is usually arbitrarily chosen as equal to the length of the streamers 104.

An example of a conventional turn manoeuver is illustrated in FIGS. 2a and 2b. In both FIGS. 2a and 2b, the turn maneuver is performed with the seismic survey system 100 having four streamers of eight kilometers long. The path in the ground reference frame describing the turn manoeuver to be followed by the vessel 102 (continuous line on FIGS. 2a and 2b) comprises two straight portions and one curved portion. In this example, the turning radius of the curved portion is of four kilometers and the crossline distance between the end of a seismic acquisition line 120 (point A of FIG. 1) and the start of the next seismic acquisition line 120' (point B of FIG. 2) is of eight kilometers. The length of the run-in portion is conventionally chosen as equal to the length of the streamers and is therefore of eight kilometers. As illustrated in FIG. 2a, in the absence of sea current, the streamers 103 shape (dashed line) has a bending radius similar to the turning radius and follows the trajectory of the vessel 102 (continuous line).

On the contrary, as illustrated in FIG. 2b, in presence of a strong sea current of 1.0 meters/second (m/s) (represented by small arrows in FIG. 2b), the streamers 103 shape (dashed line) does not have a bending radius similar to the turning radius and does not follow the trajectory of the vessel 102 (continuous line). Indeed, due to sea current, the streamers 104 are shifted and the resulting curvature of the streamers 104 has a turning radius smaller than the path initially planned. In such a case, the integrity of the seismic survey system 100, in particular the alignment of the streamers 104, source arrays 110 and/or deflectors 116 alignment is not preserved. Moreover, the mechanical and hydrodynamic stresses on the seismic elements are increased. This may lead for example to streamers 104 tangle and/or stress on the towed cables such as source cables 114 and lead-in cables 108, which may thus break.

Another drawback of the conventional method is the time it takes for the vessel 102 to perform a turn which may be of more than four hours. Indeed, a curved portion having a large turning radius is necessary to avoid the above-mentioned seismic system failure. The conventional turning radius encompasses a safety margin to be able to cope with unfavorable sea current. However, such a large turning radius increases the time taken by the vessel 102 to navigate from one seismic acquisition line to another.

OBJECTS AND SUMMARY

Therefore, turn manoeuver according to conventional methods may jeopardize the in-water seismic system integrity. There is thus a need for an optimized method to perform a turn manoeuver in presence of sea current which avoids the above-mentioned drawbacks.

According to one embodiment, the invention relates to a method for planning a trajectory to be performed by a marine vessel between a first point and a second point, the coordinates of said first and second points being pre-determined, the trajectory comprising a first path, from said first point to a third point, and a second path, from said third point to said second point, said second path being a straight portion, characterized in that the method comprises:
- a first step of computing a theoretical trajectory in a ground reference frame from said first point to said second point assuming an absence of water current, the theoretical trajectory comprising a first theoretical path, from said first point to a theoretical third point and a second theoretical path, from said theoretical third point to said second point, said second theoretical path being a straight portion,
- a second step of computing a second path in the ground reference frame and determining the coordinates of the third point taking into account at least one previously estimated parameter of water current,
- a third step of computing a corrected first path in a water reference frame from said first point to said third point, and
- a fourth step of computing the trajectory in the ground reference frame from said first point to said second point based on said corrected first path and said second path.

The method allows to adapt a trajectory to be performed by a marine vessel according to at least one parameter of water current. The method may therefore allow to decrease the travel time by either saving time when the water current is favorable or by minimizing the time increase when the water current is unfavorable. The trajectory is therefore optimized and performed in a more economical way.

According to other embodiments of the invention taken either alone or in combination:
- the marine vessel may be a seismic survey vessel towing at least one or more seismic element(s); the planed trajectory being adapted to water current, the integrity of said at least one or more seismic element(s) may be preserved during the trajectory; in particular, the tension on said one or more towed seismic element(s) may be decreased compared to a trajectory planed according to a conventional method, which advantageously avoid any failure on said one or more towed seismic element (s);
- each of said one or more towed seismic elements may be chosen among a streamer, a lead-in cable, a source arrays, a source cable, a deflector, a wide-tow rope, a spurline, and the like; the planed trajectory being adapted to water current, the geometry of the spread may be substantially maintained, in particular tangle of the streamers and/or source arrays may be avoided, tension on the lead-in cables, source cables, wide-towed ropes and spurlines may be limited, and/or tension on the deflectors may be limited while maintaining an optimized lift thereof;
- at least one of the corrected first path and second path may be computed so that the marine vessel respects at least one pre-determined constraint;
- the constraint may comprise at least a pre-determined vessel speed in the water reference frame and a predetermined turning radius in the water reference; the planed trajectory may therefore allow to avoid streamers and/or source array tangle and/or may avoid extreme tension on the towed seismic elements which otherwise may lead to failure of thereof;
- the constraint may comprise at least a pre-determined minimum speed in the water reference frame and a pre-determined maximum speed in the water reference frame, for said one or more towed seismic elements; during a curved trajectory, all the towed seismic elements are not towed at the same speed in the water reference frame, in particular, the seismic elements which are on the outer side of the curve are towed at a speed which is higher than the speed of the marine vessel while the seismic elements which are on the inner side of the curve are towed at a speed which is lower than the speed of the marine vessel (the speeds being expressed in the water reference frame); therefore, the seismic elements which are on the outer side have to be towed at a maximum speed in the water reference frame to avoid extreme tension and/or failure, and the seismic elements which are on the inner side have to be towed at a minimum speed in the water reference frame to keep control on these seismic elements and, in particular, to maintain an optimized lift and a safe geometry of these seismic elements;
- said at least one parameter of water current may be chosen among the magnitude and/or the direction of water current;
- at least one of the first theoretical path and corrected first path may be computed based on Dubins theory;
- the third step may be an iteration process; and
- the trajectory may be planned between two seismic acquisition lines; advantageously, the method may allow the towed seismic elements, in particular the streamers to be steadied and aligned before starting a new seismic acquisition line;

According to one embodiment, the invention also relates to method for performing a trajectory with a marine vessel between a first point and a second point, characterized in that said trajectory is planned the method presented above.

According to one embodiment, the value of said at least one parameter of water current may be updated at least once during the trajectory, and said method may comprise a step of modifying the planned trajectory based on said updated value by performing the method for planning a trajectory as presented above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
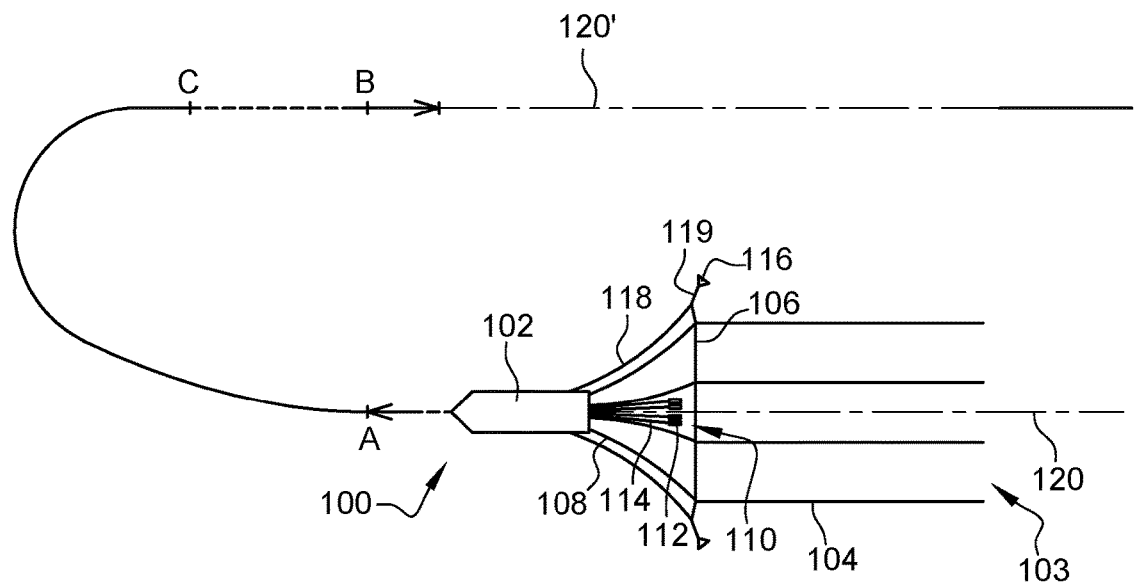
FIG. 1 illustrates a seismic acquisition system performing a turn according to a conventional method.
Figure 2A:
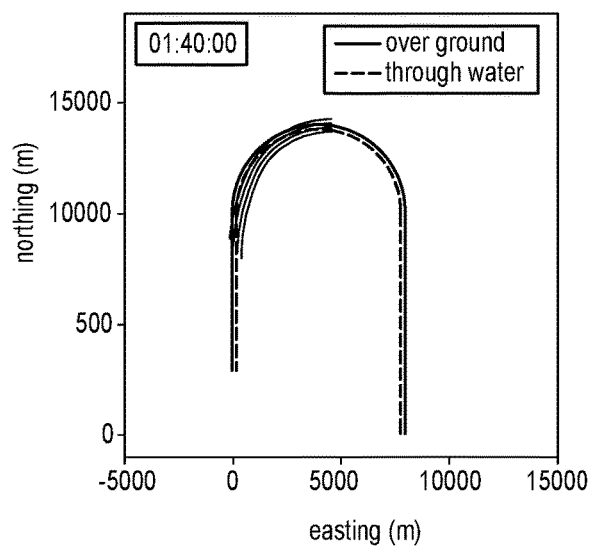
FIG. 2a illustrates the trajectory of a turn performed according to a conventional method in absence of sea current.
Figure 2B:
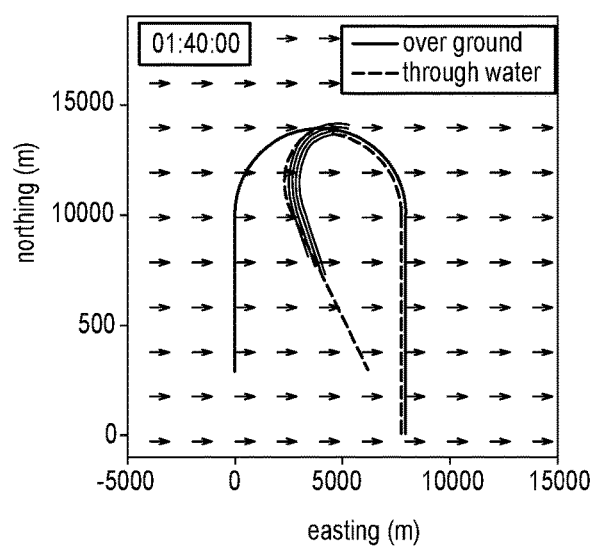
FIG. 2b illustrates the trajectory of a turn performed according to a conventional method in presence of sea current.

The following description of the embodiments refers to the accompanying drawings. The same reference numbers in different drawings identify the same or similar elements. For clarity reasons, only elements necessary for the understanding of the invention have been illustrated in the drawings in a schematic manner and without respect of the scale.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In the description, the coordinates of a point relate to the geographical coordinates, i.e. the coordinates in the ground reference frame. In the description, the coordinates of a point are indicated by two numbers, i.e. (X, Y), X being the position (in meters) of the point on the easting axe and Y being the distance (in meters) on the northing axe. The description refers to a ground reference frame and to a water reference frame. The marine vessel navigates in the water reference frame; the water reference frame overlapping the ground reference frame in the absence of water current and moving relative to the ground reference frame in the presence of water current. In the absence of water current, a trajectory in the ground reference frame is identical to a trajectory in the water reference frame.

Figure 3A:
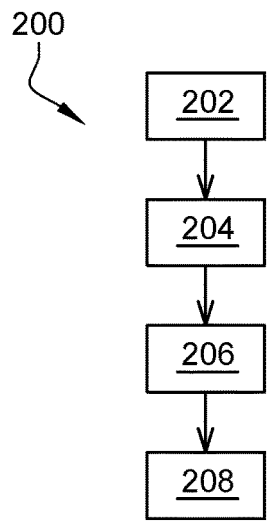
FIG. 3a is a flowchart of a method for planning a trajectory to be performed by a marine vessel according to one embodiment.

According to one embodiment illustrated in reference to FIG. 3a, the invention relates to a method 200 for planning a trajectory to be performed by a marine vessel 102 between a first point and a second point, the coordinates of said first and second points being pre-determined, the trajectory comprising a first path, from said first point to a third point, and a second path, from said third point to said second point, said second path being a straight portion, characterized in that the method comprises:

a first step 202 of computing a theoretical trajectory in a ground reference frame from said first point to said point assuming an absence of water current, the theoretical trajectory comprising a first theoretical path, from said first point to a theoretical third point and a second theoretical path, from said theoretical third point to said second point, said second theoretical path being a straight portion, a second step 204 of computing a second path in the ground reference frame and determining the coordinates of the third point taking into account at least one previously estimated parameter of water current, a third step 206 of computing a corrected first path in a water reference frame from said first point to said third point, and a fourth step 208 of computing the trajectory in the ground reference frame from said first point to said second point based on said corrected first path and said second path.

Figure 3B:
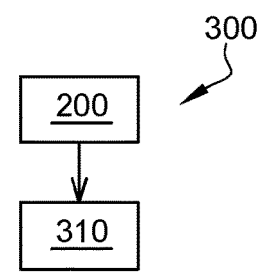
FIG. 3b is a flowchart of a method for performing a trajectory with a marine vessel according to one embodiment.

According to another embodiment illustrated in reference to FIG. 3b, the invention also relates to a method 300 for performing a trajectory with a marine vessel between a first point and a second point, said trajectory being planned using method 200.

Figure 4A:
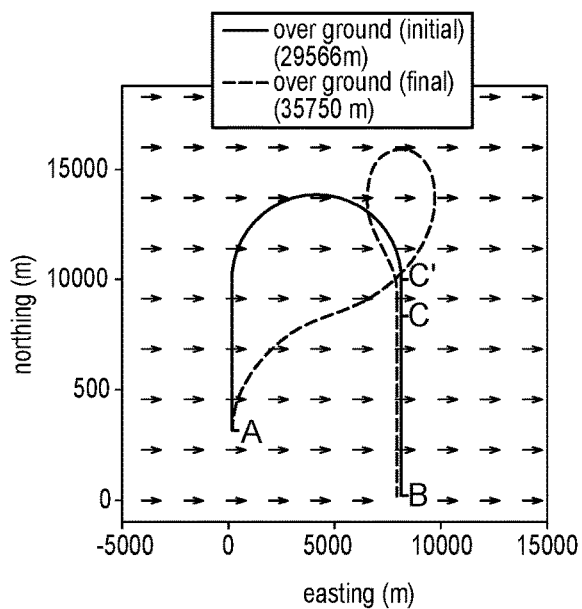
FIG. 4a illustrates, in a geographic reference system, a trajectory planned using the method according to a first exemplary embodiment of the invention.
Figure 4B:
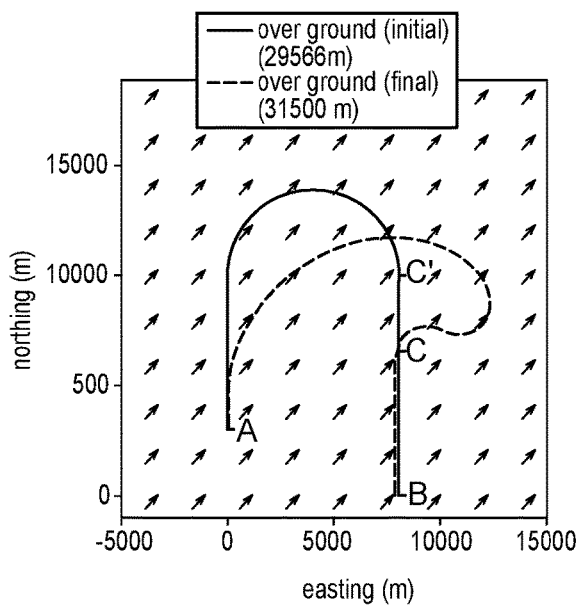
FIG. 4b illustrates, in a geographic reference system, a trajectory planned using the method according to a second exemplary embodiment of the invention.
Figure 5A:
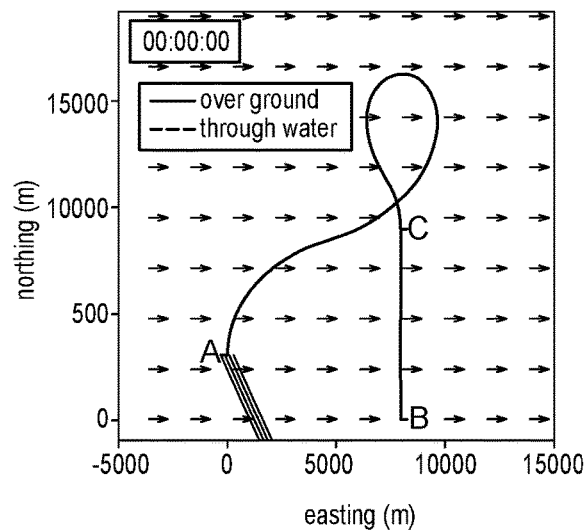
FIG. 5a to 5f illustrate, in a geographic reference system, the trajectory followed by a streamer vessel in the water reference and in the ground reference and the shape of the towed streamers at a time $t_0$ to $t_5$.
Figure 5B:
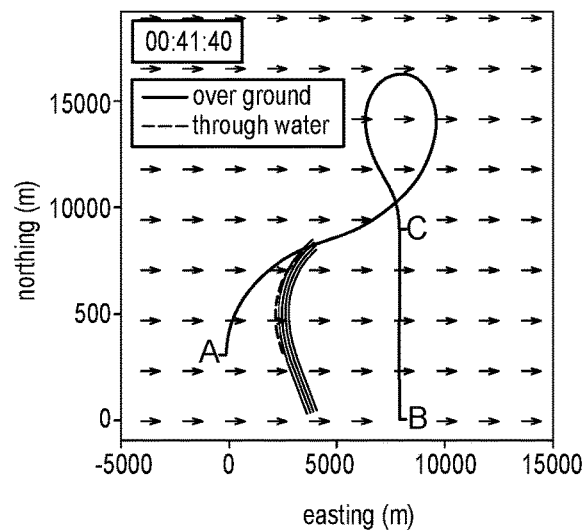
Figure 5C:
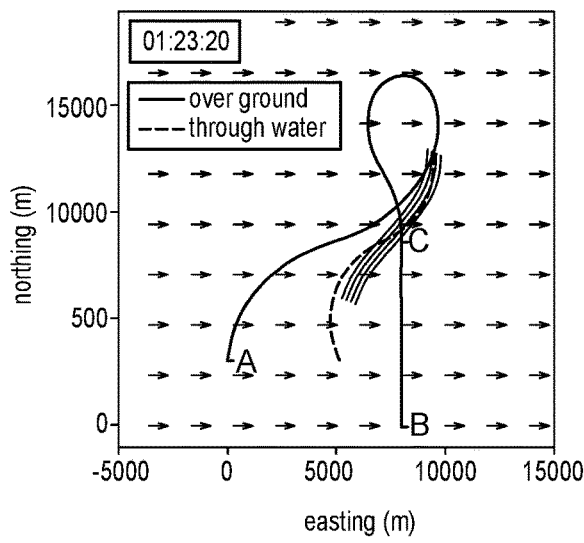
Figure 5D:
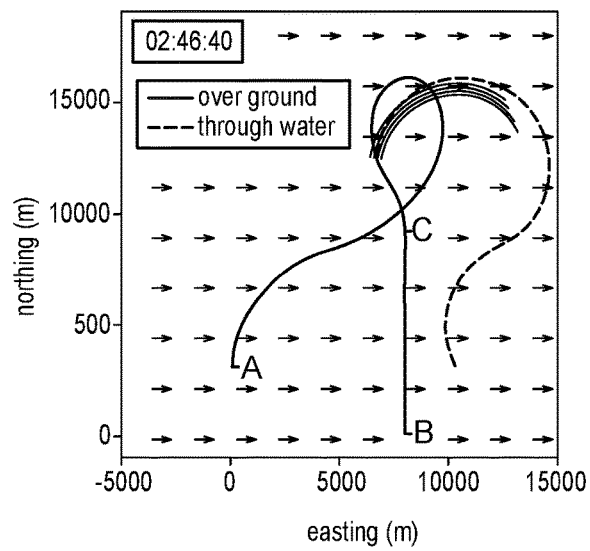
Figure 5E:
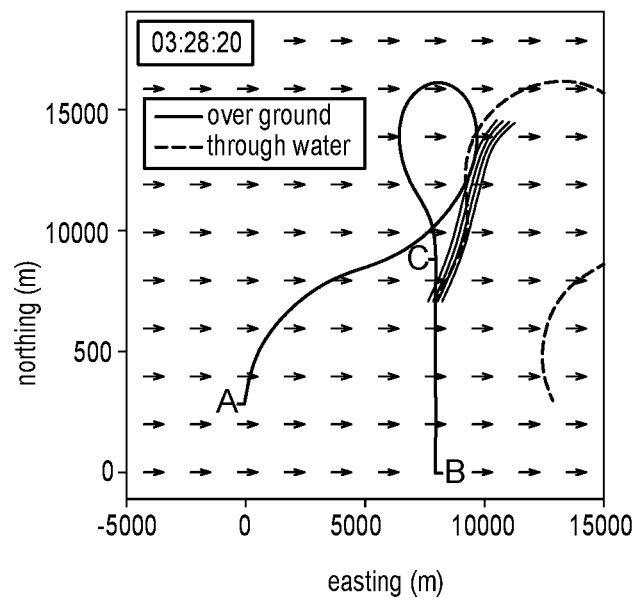
Figure 5F:
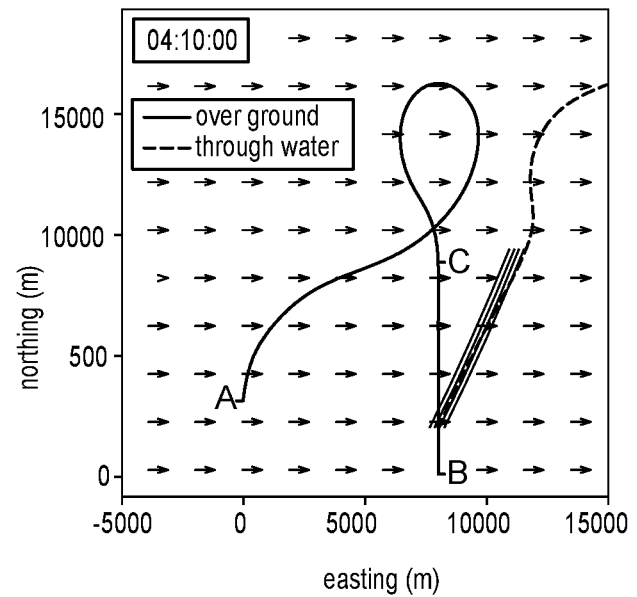

In reference to FIGS. 4a and 4b, a trajectory is planned according to a first (FIG. 4a) and to a second (FIG. 4b) exemplary embodiments of the invention. In these exemplary embodiments, the marine vessel is a seismic survey system (or seismic system) according to seismic system 100 described in reference to FIG. 1. The seismic vessel 102 tows seismic elements which are, in this embodiment, streamers 104, lead-in cables 108, source arrays 110, source cables 114, deflectors 116, wide-tow ropes 118, and a spurlines 119. In other embodiments, the seismic vessel 102 may towed only some of those seismic elements.

The streamer spread 103 comprises four streamers 104 each having a length of eight kilometers. The streamers 104 are spaced by a distance of 200 meters and the width of the streamer spread 103 is therefore of 600 meters. The vessel 102 navigates in the water reference frame at a speed of 4.5 knots, taking into account the speed limit of the deflectors 116 and the tension on the lead-in cables 108, the source cables 114 and wide-tow ropes 118.

According to these embodiments, the method is used to plan a trajectory between a first seismic acquisition line 120 and a second seismic acquisition line 120', in particular to perform a 180° turn between the end of the first seismic acquisition line, i.e. point A, and the start of the second seismic acquisition line, i.e. point B.

According to other embodiments, the method may be used with a seismic vessel towing more or less than four streamers, the streamers having any length ranging from 100 meters to 15 kilometers. The seismic vessel may tow one or more source array(s) or may not tow any source array. In other embodiments, the marine vessel may be any type of vessel.

According to yet another embodiment, the method may be used for any type of trajectory from one point to another, the trajectory being a straight line or a turn, the degree of the turn ranging from 1 to 360°.

In the first exemplary embodiment illustrated in FIG. 4a, a trajectory from a first point A of coordinates (0, 3000) to a second point B of coordinates (8000, 0) is planned in presence of a strong sea current of 1.0 m/s coming from the West.

In a first step 202, a theoretical trajectory is computed in a ground reference frame between the first point A and the second point B assuming an absence of sea current. The theoretical trajectory comprises a first theoretical path from the first point A to a theoretical third point C', and a second theoretical path from the third theoretical point C' to the second point B. As, at this step, an absence of sea current is assumed, the water reference frame and the ground reference frame overlap.

The second theoretical path is a straight portion which corresponds, in this embodiment, to the run-in portion allowing the streamers 104 to be steadied and aligned at second point B, i.e. just before starting the second seismic acquisition line 120'. In this exemplary embodiment, the length of the straight portion is determined in the water reference frame (which overlap the ground reference frame as an absence of sea current is assumed) taking into account the length of the streamers and the speed of the seismic vessel. However, in other exemplary embodiments, the second theoretical path may have any length, the length being determined taking into account only the length of the streamers or only the speed of the seismic vessel, and/or taking into account other parameters. In this exemplary embodiment, the length of the second theoretical path is of 10 kilometers. The determination of the second theoretical path allows to determine the coordinates of the third theoretical point C' as being (8000, 10000).

In this exemplary embodiment, the first theoretical path from the first point A to the third theoretical point C' is a curved portion. In the invention, a curved portion is defined as a path comprising one or more arc(s) of circle and optionally one or more straight portion(s). In this exemplary embodiment, the shape of the first theoretical path, i.e. the shape of the curved portion, is computed using Dubins theory (see Dubins, L. E., American Journal of Mathematics, "On curves of minimal length with a constraint on average curvature, and with prescribed initial and terminal positions and tangents", 1957, vol. 79, p. 497-516). To compute the first theoretical path, parameters of the seismic system 100 are taken into account, in particular the speed of the vessel, the length of the streamers, and the width of the streamer spread. In other possible embodiments, the shape of the curved portion may be determined by other method. In yet other embodiments, the first theoretical path is not a curved portion and may have any shape.

In a second step 204, a corrected second path is computed and the coordinates of a third point C are determined, taking into account at least one previously estimated parameter of sea current (or water current).

In this exemplary embodiment, the sea current comes from the West with a magnitude of 1.0 m/s. The magnitude and/or the direction of sea current may be determined for example by current sensors such as acoustic an Doppler current profiler placed on the vessel 102, by weather forecasts, by a forward reconnaissance boat, analysis of the shift of the streamers, or the like.

In this embodiment, the parameters of sea current are measured (based for example on ocean models or satellite measures) when the vessel 102 is approaching from first point A. Based on these parameters, an estimation of sea current is made for the period of the trajectory from the first point A to the second point B and said sea current is considered constant during said period. The parameters of sea current are therefore estimated just before planning the trajectory, which allows the estimation of sea current parameters during the trajectory to be as accurate as possible by using all available information at the start of the trajectory. In other possible embodiments, the sea current may be measured or estimated at any time before planning the trajectory from the first point A to the second point B.

In the first step 202, the length of the second theoretical path was determined in the water reference frame and the coordinates of the third theoretical point C' were also obtained. In the second step 204, a corrected second path is computed taking into account the magnitude and direction of sea current. In other words, the second theoretical path in the ground reference frame (in absence of sea current) is corrected to determine the length of this second path in the ground reference frame in presence of sea current. In this exemplary embodiment, the length of the second path is determined by dividing the period (or time) of the trajectory from point C' to point B in absence of sea current by the speed of the seismic vessel in the water reference frame (which takes into account the magnitude and direction of sea current). In this exemplary embodiment, the length of the second path which is of 9300 meters is slightly shorter than the length of the second theoretical path which is of 10000 meters. The computing of the second path allows to obtain the coordinates of third point C as being (8000, 9300).

In this embodiment, the computing of the second path and the determination of third point C coordinates take into account two parameters of sea current. However, in other possible embodiments, only one parameter of sea current, i.e. the magnitude or the direction of sea current, may be taken into account to compute the second path and determine the coordinates of third point C.

In a third step 206, a corrected first path in the water reference frame from said first point A to said third point C is computed using an iterative method based on Dubins theory.

The algorithm used in this embodiment comprises a step of initialization (n=0) wherein a corrected first path from first point A to third point C and associated corrected first path travel time $t_C^0$ are computed according to Dubins theory.

Then, iterations are performed using the following steps (n):

i. Translated first point A' is computed according to equation (1):

$$A' = A + \int_0^{t_C^{(n-1)}} v_C(t) dt \qquad (1)$$

In other words, the translated first point A' corresponds to a translation of first point A by a vector equal to the integral of the sea current over the travel time $t_C^{(n-1)}$ while performing the trajectory (computed at the initialization step) from first point A to third point C at sea current magnitude (or speed) $v_{C(t)}$.

ii. Compute the corrected first path using Dubins theory between translated first point A' and third point C and also computing the associated travel time $t_{C(n)}$.

Iterations are performed until the condition of equation (2) is fulfilled:

$$|t_C^n - t_C^{n-1}| < \varepsilon \qquad (2)$$

At the end of the iterations, the corrected first path has been computed in the water reference frame and the associated travel time has been determined.

In this exemplary embodiment, an iterative method is used to compute the corrected first path based on the Dubins theory in the water reference frame. However, in other possible embodiments, the corrected first path may be computed using a method which may be iterative or not, and which may be based on the Dubins theory or based on another method allowing to determine the trajectory in the water reference frame.

In a fourth step 208, a trajectory in the ground reference frame from said first point A to said second point B is computed based on the corrected first path computed in the third step 206 and second path computed in the second step 204.

The corrected first path was computed in the third step 206 in the water reference frame. The first path in the ground reference frame is then determined by considering the moving of the water reference frame relative to the ground reference frame (i.e. based on magnitude and direction of sea current). The trajectory in the ground reference frame is then obtained by adding the first and second paths in the ground reference frame.

Using the method of the invention, a trajectory in the ground reference frame has been planned and is represented by the dashed line trajectory in FIG. 4*a*.

In the second exemplary embodiment of FIG. 4*b*, a trajectory from a first point A to a second point B is planned in presence of a strong sea current of 1.0 m/s coming from the South-West. The coordinates of point A and point B are identical to those described for the first exemplary embodiment. The steps and features described above for the first exemplary embodiment also apply to the second exemplary embodiment.

In particular, the first step 202 of this second exemplary embodiment is identical to the first step 202 of the first exemplary embodiment as, for this step, an absence of sea current is assumed.

In this second exemplary embodiment, the second path which has a length of 7000 meters is significantly shorter than the second theoretical path which has a length of 10000. The computing of the second path allows to obtain the coordinates of third point C as being (8000, 7000).

As illustrated by the first a second exemplary embodiments, the trajectory as planned by method 200 may have totally different shape depending on sea current.

FIGS. 5*a* to 5*f* illustrate the trajectory planned using the method of the first exemplary embodiment (described in reference to FIG. 4*a*) and also illustrates the position of the vessel 102 performing the planned trajectory at six different times during the trajectory. In this example the parameters of the sea current are considered identical to the parameters measured for planning the trajectory and are considered constant during the trajectory. In another exemplary embodiment, it may be possible to apply the same method with a time varying current.

In FIGS. 5*a* to 5*f*, the continuous line illustrates the ground trajectory performed by the vessel 102 and the dashed line illustrates the water trajectory followed by the vessel 104. The ground trajectory performed by the vessel 102 is represented in the ground reference frame and the water trajectory followed by the vessel 104 is represented in the water reference frame. Due to the sea current, the water reference frame move relative to the ground reference frame and, therefore, on the FIGS. 5*a* to 5*f*, the water trajectory followed by the vessel 104 moves toward the East from $t_0$ to $t_5$. The position of the streamer spread 103 is illustrated at each of $t_0$ to $t_5$.

As illustrated in FIGS. 5*a* to 5*f*, the trajectory planned according to the method 200 and performed by the vessel 102 according to method 300 allows to perform an optimized turn. Indeed, the turning radius of the curve followed by the seismic vessel 102, and also by the other towed seismic elements, is always large enough to avoid any extreme tension and/or failure of the towed seismic elements. At point B, i.e. before starting the second seismic acquisition line 102', the streamers are therefore steadied and aligned.

Advantageously, when the vessel performs the trajectory as planned by method 200, the geometry and integrity of the seismic survey system 100, in particular the alignment of the streamers 104, source arrays 110 and/or deflectors 116 alignment is substantially preserved. Moreover, the mechanical and hydrodynamic stress on the seismic elements is limited. Such a trajectory avoids streamers 104 tangle and/or stress on the towed cables such as source cables 114 and lead-in cables 108, which limits the risk of breaking.

According to an embodiment of the invention, the trajectory is planned so that the marine vessel respects at least one pre-determined constraint. In particular, at least one of the corrected first path and the second path is computed so that the marine vessel respects at least one pre-determined constraint.

According to this embodiment, the constraint may comprise at least two conditions which are a pre-determined vessel speed in the water reference frame and a predetermined turning radius in the water reference frame. These two conditions are pre-determined based, for example, on the mechanical properties of the towed seismic elements, the length and number of the streamers 104, the equipment state and/or environmental conditions (fouling, sea state . . . ).

According to this embodiment, the constraint may further comprise, or either comprise, at least two other conditions which are a pre-determined minimum speed in the water reference frame and a pre-determined maximum speed in the water reference frame, for said one or more towed seismic elements. Indeed, during a curved trajectory, all the towed seismic elements are not towed at the same speed, in particular, the seismic elements which are on the outer side of the curve are towed at a speed which is higher than the speed of the marine vessel while and the seismic elements which are on the inner side of the curve are towed at a speed which is lower than the speed of the marine vessel; therefore, the seismic elements which are on the outer side have to be towed at a maximum speed to avoid extreme tension and/or failure, and the seismic elements which are on the inner side have to be towed at a minimum speed to keep control on these seismic elements and to maintain an optimized lift and a safe geometry of these seismic elements.

In the previously described embodiment, the parameters of water current were considered constant during the time of the trajectory from first point A to second point B. However, according to another embodiment, the value of at least one parameter of water current may be updated at least once during the trajectory, and the method may comprise a step of modifying the planned trajectory based on said updated value by performing the method according to method 200.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods.

The patentable scope of the subject matter is defined by the claims, and may include other examples that occur to those skilled in the art. Such other examples are intended to be within the scope of the claims.

The invention claimed is:

1. A method for planning a trajectory to be performed by a marine vessel between a first point and a second point, the coordinates of said first and second points being pre-determined, the trajectory comprising a first path, from said first point to a third point, and a second path, from said third point to said second point, said second path being a straight portion, wherein the method comprises:
   a first step of computing a theoretical trajectory in a ground reference frame from said first point to said second point assuming an absence of sea current, the theoretical trajectory comprising a first theoretical path, from said first point to a theoretical third point and a second theoretical path, from said theoretical third point to said second point, said second theoretical path being a straight portion,
   a second step of computing said second path in the ground reference frame based on the second theoretical path, by correcting the longitudinal length of said theoretical path towards said second point, and determining the coordinates of a third point which is closer to said second point than said theoretical third point, taking into account at least a previously estimated magnitude of a sea current and direction of the sea current,
   a third step of computing a corrected first path in a water reference frame from said first point to said third point,
   a fourth step of computing the trajectory in the ground reference frame from said first point to said second point based on said corrected first path and said second path,
   wherein the vessel performs said trajectory; and
   wherein at least one of the first theoretical path and corrected first path is computed, by iteratively inputting each of at least a speed of the vessel, a length of the streamers, and a width of the streamer spread,
   said calculations including generating a translated first point from said first point by vector equal to the integral of the sea current over the travel time while performing the trajectory from the first point to the third point at said estimated magnitude of a sea current,
   computing the corrected first path or the first theoretical path using Dubins theory between the translated first point and the third point, and computing the travel time, and
   performing iterations until either of said first theoretical path or said corrected first path are determined in the water reference frame.

2. The method according to claim 1, wherein the marine vessel is a seismic survey vessel towing at least one or more seismic element(s).

3. The method according to claim 1, wherein each of said one or more towed seismic elements are chosen among a streamer, a lead-in cable, a source arrays, a source cable, a deflector, a wide-tow rope, and a spurline.

4. The method according to claim 1, wherein at least one of the corrected first path and second path is computed so that the marine vessel respects at least one pre-determined constraint.

5. The method according to claim 4, wherein the constraint comprises at least a pre-determined vessel speed in the water reference frame and a predetermined turning radius in the water reference frame.

6. The method according to claim 4, wherein the constraint comprises at least a pre-determined minimum speed in the water reference frame and a pre-determined maximum speed in the water reference frame, for said one or more towed seismic elements.

7. The method according to claim 1, wherein the third step is an iteration process.

8. The method according to claim 1, wherein the trajectory is planned between two seismic acquisition lines.

9. A method for performing a trajectory with a marine vessel between a first point and a second point, the coordinates of said first and second points being pre-determined, the trajectory comprising a first path, from said first point to a third point, and a second path, from said third point to said second point, said second path being a straight portion, wherein said trajectory is planned by:
   computing a theoretical trajectory in a ground reference frame from said first point to said second point assuming an absence of sea current, the theoretical trajectory comprising a first theoretical path, from said first point to a theoretical third point and a second theoretical path, from said theoretical third point to said second point, said second theoretical path being a straight portion,
   computing said second path in the ground reference frame based on the second theoretical path, by correcting the longitudinal length of said second theoretical path towards said second point, and determining the coordinates of a third point which is closer to said second point than said theoretical third point, taking into account at least a previously estimated magnitude of sea current and direction of sea current,
   computing a corrected first path in a water reference frame from said first point to said third point,
   computing the trajectory in the ground reference frame from said first point to said second point based on said corrected first path and said second path;
   wherein at least one of the first theoretical path and corrected first path is computed, by iteratively inputting each of at least a speed of the vessel, a length of the streamers, and a width of the streamer spread,
   said calculations including generating a translated first point from said first point by vector equal to the integral of the sea current over the travel time while performing the trajectory from the first point to the third point at said estimated magnitude of a sea current,
   computing the corrected first path or the first theoretical path using Dubins theory between the translated first point and the third point, and computing the travel time, and
   performing iterations until either of said first theoretical path or said corrected first path are determined in the water reference frame.

10. The method according to claim 9, wherein the values of said magnitude of sea current and direction of sea current are updated at least once during the method of planning the trajectory, and in that said method comprises a step of modifying the planned trajectory based on said updated value.

* * * * *